US006908552B2

(12) United States Patent
Siwy et al.

(10) Patent No.: US 6,908,552 B2
(45) Date of Patent: Jun. 21, 2005

(54) METHOD OF PRODUCING NANOSTRUCTURES IN MEMBRANCES, AND ASYMMETRICAL MEMBRANE

(75) Inventors: Zuzanna Siwy, Darmstadt (DE); Dobri D. Dobrev, Darmstadt (DE); Reinhard Neumann, Darmstadt (DE); Christina Trautmann, Darmstadt (DE); Kai Voss, Darmstadt (DE)

(73) Assignee: Gesellschaft fuer Schwerionenforschung mbH, Darmstadt (DE)

( * ) Notice: Subject to any disclaimer, the term of this patent is extended or adjusted under 35 U.S.C. 154(b) by 265 days.

(21) Appl. No.: 10/085,523

(22) Filed: Feb. 26, 2002

(65) Prior Publication Data

US 2003/0159985 A1 Aug. 28, 2003

(51) Int. Cl.[7] .............................................. B01D 39/00
(52) U.S. Cl. .......................... 210/500.39; 210/500.27; 264/41; 264/154; 264/156
(58) Field of Search .................. 210/500.27, 500.39, 210/500.38; 264/41, 154, 156, 163; 156/252, 305, 47, 43, 435, 51

(56) References Cited

U.S. PATENT DOCUMENTS

| | | | | | |
|---|---|---|---|---|---|
| 3,770,532 | A | | 11/1973 | Bean et al. ..................... | 156/7 |
| 4,400,235 | A | * | 8/1983 | Coquin et al. ............... | 438/710 |
| 4,832,997 | A | * | 5/1989 | Balanzat et al. ............. | 428/131 |
| 4,923,608 | A | * | 5/1990 | Flottmann et al. ...... | 210/500.25 |
| 5,271,839 | A | * | 12/1993 | Moya et al. ................. | 210/490 |
| 5,362,525 | A | * | 11/1994 | Nishii et al. ................ | 427/554 |
| 5,637,925 | A | * | 6/1997 | Ludden et al. .............. | 257/774 |
| 5,753,014 | A | * | 5/1998 | Van Rijn ....................... | 96/12 |
| 6,011,265 | A | * | 1/2000 | Sauli .......................... | 250/374 |
| 6,427,419 | B2 | * | 8/2002 | Owensby ..................... | 53/396 |
| 6,716,444 | B1 | * | 4/2004 | Castro et al. ............... | 424/422 |
| 6,726,727 | B2 | * | 4/2004 | Scott et al. .................. | 522/161 |

FOREIGN PATENT DOCUMENTS

| DE | 38 16078 A1 | 5/1988 |
|---|---|---|
| DE | 42 10 486 C1 | 3/1992 |

OTHER PUBLICATIONS

P. Yu. Apel, et al., Morphology of Latent and Etched Heavy Ion Tracks in Radiation Resistant Polymers Polyimide and Poly(ethylene naphthalate), Nuclear Instruments and Methods in Physics Research B 185 (2001) pp. 216–221.

D. Bauer, et al., Relevance of Surface Gels for Ion Track Etching in Polymers, Gesellschaft für Schwerionenforschung, Planckstr. 1, D–64291 Darmstadt, Germany, Flerov Laboratory of Nuclear Reactions, JINR, 141980, Dubna, Russia, Imperial College, Hammersmith Campus, Du Cane Road, London W12 0NN, U.K., (2001) (one page).

A.L. Vilensky, et al. Polyimide Track Membranes for Ultrafiltration and Microfiltration, Polymer Science, vol. No. 36, No. 3, (1994) Birmingham, Alabama, pp. 391–400.

(Continued)

*Primary Examiner*—Ana Fortuna
(74) *Attorney, Agent, or Firm*—Frommer Lawrence & Haug LLP; Ronald R. Santucci

(57) ABSTRACT

The invention relates to a method of producing nanostructures in membranes, in which method a membrane consisting of a polymer material is irradiated with charged particles, especially ions, to produce particle tracks. The particle tracks in the membrane are etched using an etching liquid and the etching operation is stopped using a stop liquid, in such a manner that asymmetrical structures are formed. Polyimide is used as the membrane material.

6 Claims, 6 Drawing Sheets

OTHER PUBLICATIONS

Figure 1:
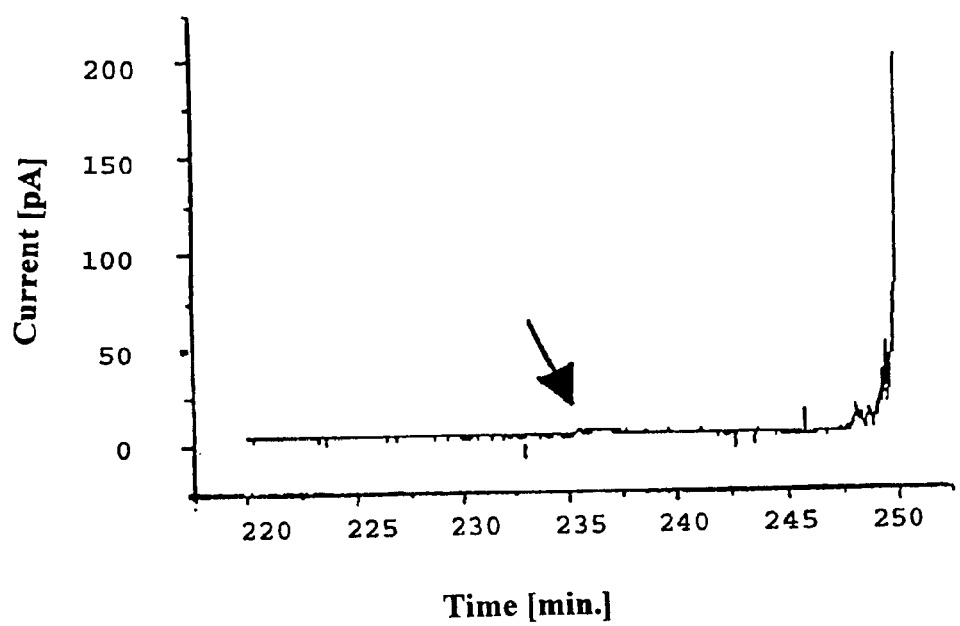

K. Schmidt–Rohr, Elucidation of the Chain Conformation in a Glassy Polyester, PET, by Two–Dimensional NMR, Science, vol. 280, (May, 1998) pp. 714–717.

P. Apel, Track Etching Technique in Membrane Technology, Elsevier Science Ltd., Radiation Measurements 34 (2001) pp. 559–566.

P. Yu. Apel, et al., Diode–like Single–Ion Track Membrane Prepared By Electro–Stopping, Nuclear Instruments and Methods in Physics Research, B 184 (2001) 337–346.

C. Trautmann, et al., Pore Geometry of Etched Ion Tracks in Polyimide, Nuclear Instruments and Methods in Physics Research B 111 (1996) pp. 70–47.

Lena Klintberg, et al., Sodium Hypochlorite as a Developer for Heavy Ion Tracks in Polyimide, Nuclear Instruments and Methods in Physics Research B 184 (2001) pp. 536–543.

* cited by examiner a)

b)

c)

METHOD OF PRODUCING NANOSTRUCTURES IN MEMBRANCES, AND ASYMMETRICAL MEMBRANE

The present invention relates to a method of producing nanostructures in membranes, in which method a membrane consisting of a polymer material is irradiated with charged particles, especially ions, to produce particle tracks, the particle tracks are etched using an etching liquid and the etching process is stopped using a stop liquid, in such a manner that asymmetrical structures are formed.

The use of porous membranes is a technological area that is becoming increasingly important. In order to produce porous membranes, the membranes are irradiated with energetic articles and then chemically etched, producing pore channels. The pores may have a diameter of from a few tens of nanometers to in the micrometer range and are very homogeneous. Pores having diameters in the nm range are restricted in their use because mass transport through the small pores is poor. Polyethylene terephthalate (PET) is widely used. A method of etching ion tracks in PET membranes is described in P. Apel, Y. E. Korchev, Z. Siwy, R. Spohr, M. Yoshida, Diode-like single ion track membrane prepared by electra-stopping, Nucl. Instrum. Meth. B 184, 337 (2001).

It has been demonstrated, however, that an ionic current through nanopores does not result in a stable signal but fluctuates appreciably, the fluctuation amplitudes possibly even reaching 100% of the signal. The small pores with diameters of approximately 2 nm tend to close. This arises as a result of the chemical nature of such materials and the principles of the track etching technique. One reason is thought to be that, after irradiation with heavy ions and subsequent chemical etching, broken parts of polymer chains, so-called dangling ends, are produced, which coincidentally, in accordance with the theory of polymers in solution, move continuously, even without the application of an electric field. They also appear to contribute to the formation of a gel layer, which makes the transport through the pores even more uncertain (Schmidt-Rohr, K., Hu, W. & Zumdulyadis, N., Elucidation of the Chain Conformation in a Glassy Polyester, PET, by Two-Dimensional NMR, Science, 280, 714–717 (1998); D. Baur, Y. Korchev, C. M üller, Z. Siwy, H. Spohr, R. Spohr, Surface gel in ion track etching—Observation and consequences, GSI Jahresbericht [annual report], 2001).

A further problem that arises in transport through porous membranes is the thickness of the membranes, which has an appreciable effect on the current being measured, for example the ionic current. Conical pores in PET were developed as a solution to that problem. However such pores have a small angle of aperture of a few degrees (only up to four degrees), which results in inadequate amplification of the ionic current (P. Apel, Y. E. Korchev, Z. Siwy, R. Spohr, M. Yoshida, loc. cit.). Asymmetrical pores in PET do not give an ionic current signal that is stable over time.

The polyimide Kapton has already been used for particle track membranes in a large number of fields. The choice of that polyimide is because of its excellent mechanical and electrical stability within a wide temperature range. Those properties result from the chemical structure of the polymer, which is based chiefly on aromatic rings. When Kapton is used, precise control of the pH value of the etching agent has proved important so that an advantageous pore size distribution is obtained (Trautmann, C., Bruechle, W., Spohr, R., Vetter J. and Angert, N., Pore geometry of etched ion tracks in polyimide, Nucl. Instrum. Meth. B, 111 (1996) 70–74).

The problem underlying the invention is to create a porous membrane that renders possible a stable mass transport, especially of ions, and thus generates a stable signal and has a rapid response.

The problem is solved in a production method having the features given in claim 1, and in a membrane having the features given in claim 5. Advantageous further developments and variants form the subject of the dependent claims.

The method of producing nanostructures in membranes in accordance with the invention thus comprises irradiating a membrane consisting of a polymeric material with charged particles, especially ions, to produce particle tracks, etching the particle tracks of the membrane using an etching liquid and stopping the etching operation using a stop liquid, in such a manner that asymmetrical structures are formed. Polyimide is used as the membrane material.

The method according to the invention is distinguished by the choice of the track etching technique and of the polymer material for the purpose of producing asymmetrical pores.

The membrane material chosen is a polyimide, preferably Kapton of type H, which is supplied by DuPont. The chemical structure of the membrane material ensures the smoothness of the pore walls, with the breaking up of the Kapton polymer chains and the etching resulting in the formation of carboxyl groups, which are located on the aromatic ring. During the course of this, however, the structure as a whole remains rigid.

The geometry of the etching tracks is determined by two etching operations, one which occurs along the ion track, and one by which the material itself is etched, hence the track etching rate and the material etching rate. The ratio of those etching rates in turn determines the angle of aperture of the resulting pores. The pH value has an effect especially on the material etching rate. In the case of Kapton that rate is high, resulting in a larger angle of aperture (see DE 42 10 486 Cl).

In the production of the asymmetrical pores in a porous membrane in accordance with the invention, it is very important that the pores have a very sharp conical apex. It is therefore necessary, after the point in time at which breakthrough occurs has been reached, for the etching operation to be stopped immediately. When NaOCl is used as etching agent, in which the OCl⁻ ions are employed as the active agent, stop solutions of the redox type must be used. In an advantageous variant of the method, a 1M solution of potassium iodide is therefore used, which at the point in time at which breakthrough occurs brings about the following chemical reaction:

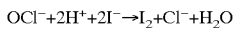

$$OCl^-+2H^++2I^-\rightarrow I_2+Cl^-+H_2O$$

As a result of the presence of $I_2$, the solution becomes yellow, which in addition provides a colour check of the reaction. It is also possible to use other reducing agents instead of the ion OCl⁻, for example $NO_2^-$, $S_2O_3^{2-}$, $Mn^{2-}$.

The asymmetrical shape of the pores, which transfer charges to the walls, ensures the voltage sensitivity of the pore on account of the asymmetry of the electric field at the two entrances. The pore thus rectifies the ionic current.

As a result of the markedly asymmetrical nanopores of the porous membrane according to the invention, smooth walls and very sharp (nm diameter) conical apices are obtained.

Figure 2:
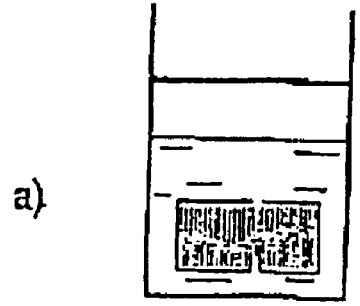
Figure 2:
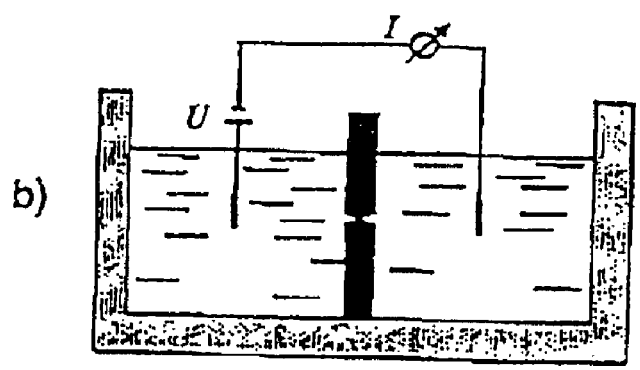
Figure 2:
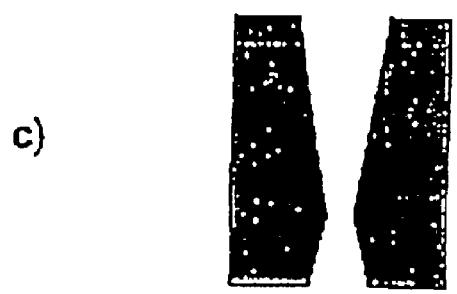
Figure 3:
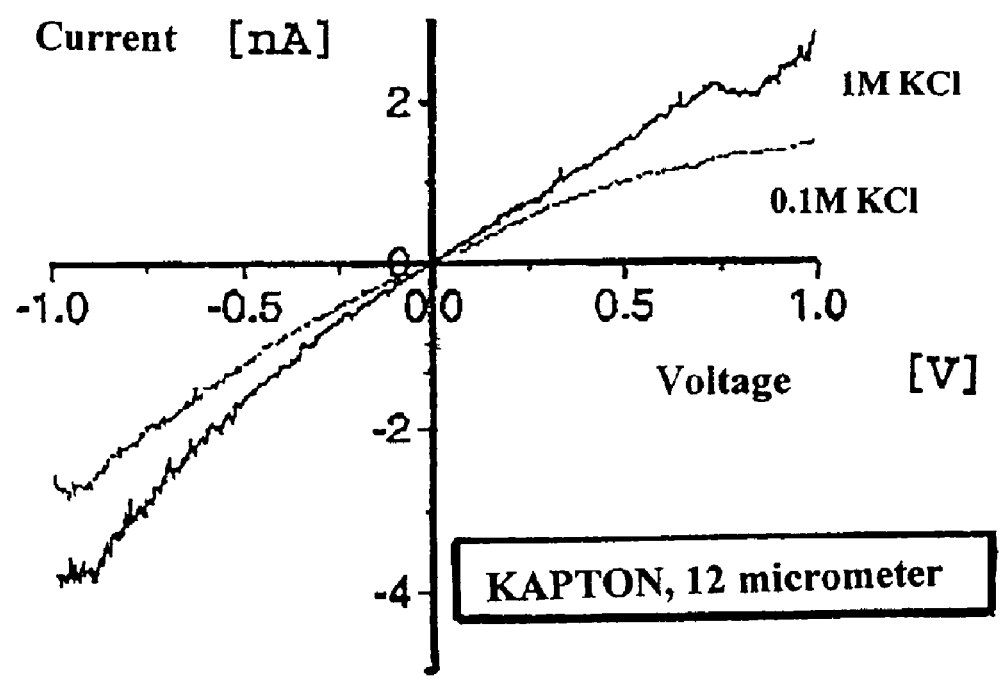
Figure 4:
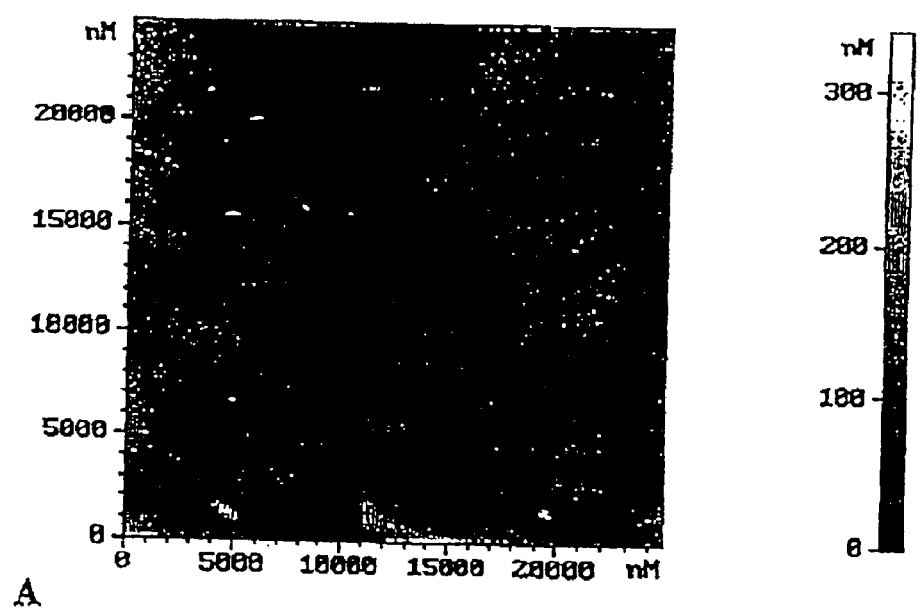
Figure 5:
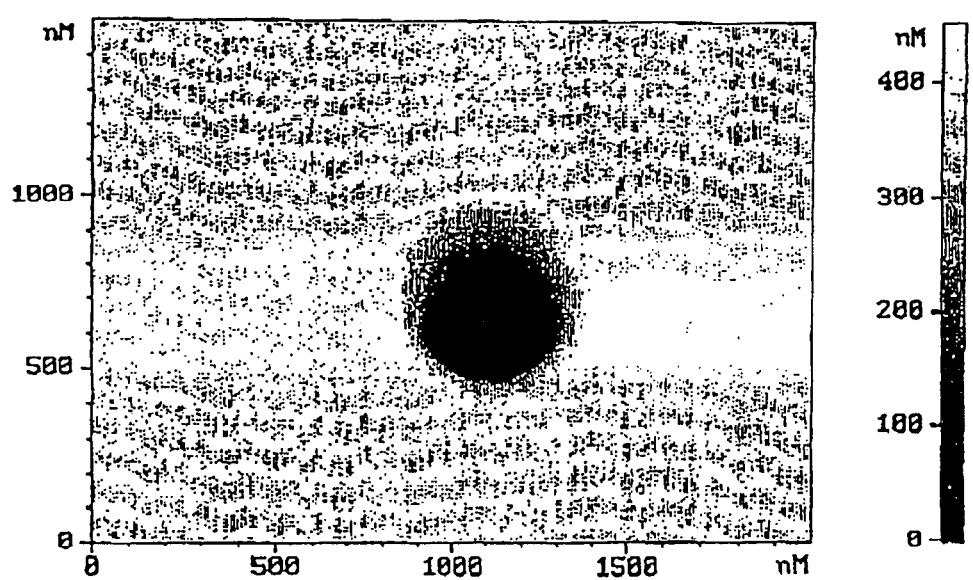
Figure 6:
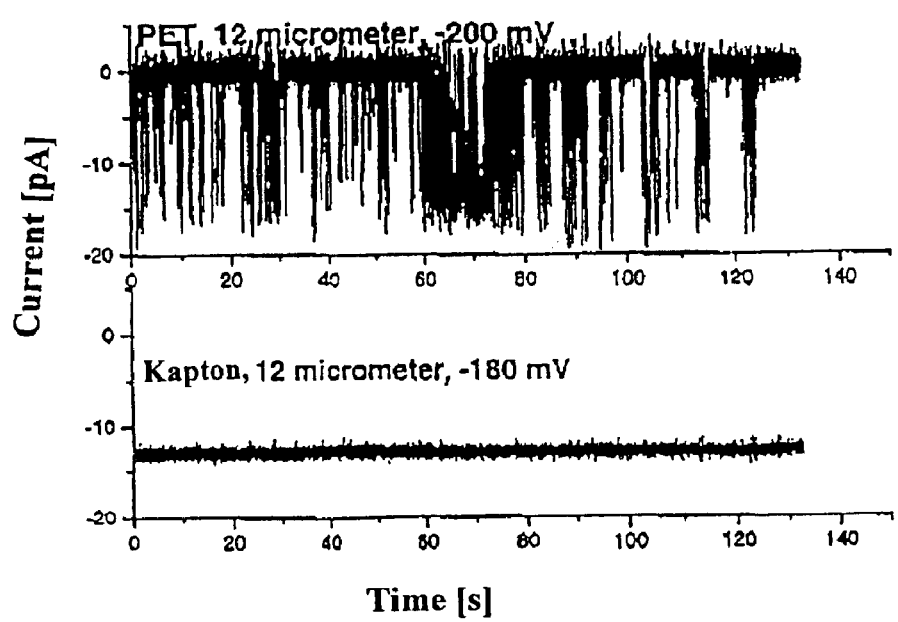

The invention is illustrated in the following with reference to one embodiment example and to the drawings. In the drawings:

FIG. 1 shows the current flow during the etching operation, the point in time at which breakthrough occurs being indicated by an arrow, FIGS. 2a) to c) show the course of the asymmetrical etching operation for the production of pores having a double cone, FIG. 3 shows the current/voltage characteristic asymmetry of a switch membrane having a single conical pore in a pH and concentration environment that is symmetrical, FIG. 4 is an illustration of the smoothness of the specimen after the etching operation has been carried out, FIG. 5 is a view of an enlarged pore, consequent upon FIG. 4 and FIG. 6 shows a comparison of the current/time characteristic of an asymmetrical nanopore in PET and in Kapton.

Described in the following is an example of the production of an electrically switchable, single-pore membrane. A circular disc 12 μm thick and 30 mm in diameter made of polyimide (Kapton H. DuPont) was irradiated in the centre with 11.4 MeV/nucleon of uranium ions of specific energy and etched from one side at 50° C. in NaOCl (pH 12.5, 13% active chlorine content). For that purpose, the membrane was introduced into an electrolytic cell consisting of two cell halves of caustic-soda-resistant Kel-F (trade name= polychlorotrifluoroethylene, CClF$_3$) and hermetically sealed by the application of pressure to the two cell halves (see P. Apel, Y. E. Korchev, Z. Siwy, R. Spohr, M. Yoshida, loc. cit.).

During the etching operation, each cell half was provided with a platinum electrode and, during the measurement of the electric current/voltage characteristic, each cell half was provided with a silver/silver chloride electrode. One cell half contained the etching agent and the other cell half the stop agent. A potential difference was applied across the membrane. A potential difference of 1 V enables rapid determination of the breakthrough current and does not result in electrical breakdown of the polymer sheet. The stop agent was an aqueous 1M KI solution. The electric current through the membrane was regulated during the etching operation. After the breakthrough, the stop solution became yellow as a result of the formation of I$_2$. When a predetermined value of the measured current was exceeded, the etching operation was discontinued by washing out the etching agent with water and KI.

This process resulted in a mechanically resistant, durable membrane having an asymmetric pore with a narrow aperture in the nanometer range. FIG. 1 shows the plotted breakthrough current. The moment of breakthrough can be recognised by the increase in current (see arrow). In order to be able to observe development of the pore, the specimen was etched for longer.

Scanning electron microscopy (using specimens of 10$^6$ pores/cm$^2$) was used to ascertain the diameter of the large aperture of the pore. The material etching rate, which was measured at 50° C. in the conductivity measuring vessel, was 0.004 μm/min. After 4.5 hours, the time required on average to etch a 12 μm Kapton sheet, the large aperture had a diameter of approximately 2 μm.

The diameter of the small aperture was etched on the basis of current measurements using the standard KCl solution. The resulting pore having assumed an ideal cone shape, its conductivity G was integrated with the pore apertures D, d by the following relationship:

$$G = I/U = \pi.D.d.\kappa/4.L,\text{ therefore}$$

$$d = 4.L.I/\pi.D.\kappa.U,$$

L being the length of the pore, κ the conductivity of the electrolyte, U the voltage applied and I the ionic current measured.

The size of d was 2 nm, while the angle of aperture was approximately 12 degrees.

The asymmetrical etching procedure can also be used to produce pores having a double cone, as shown in FIG. 2. FIG. 2a) illustrates the preliminary etching of the polymer sheet from both sides (for Kapton, NaOCl was used as the etching agent). This results in the formation of two small cones. FIG. 2b) illustrates the continuation of the asymmetrical etching in which the etching agent was located in the left half of the cell and the stop agent in the right half of the cell. The one-sided and consequently asymmetrical etching results in the enlargement of one cone, while the other cone is protected by the stop agent. The pore obtained is illustrated diagrammatically in FIG. 2c).

FIG. 3 shows the current/voltage characteristic of a Kapton membrane having a single conical pore in a pH and concentration environment that is symmetrical. The pH value was maintained at 7 on both sides of the membrane. The electric current depends on the polarity of the voltage applied. For the same absolute value of the voltage, different electric currents are obtained. The data were obtained for 1 and 0.1 M KCl on both sides of the membrane.

FIG. 4 illustrates the smoothness of the specimen after the etching was confirmed by AFM investigations of the Kapton sheet carried out in water. The etched side is indicated by (A). The enlarged single pore (B) is shown in FIG. 5. The etched Kapton sheet is imaged under water, and the sheet was irradiated with Xe ions (10$^4$ ions/cm$^3$, 11.4 MeV/nucleon), and etched at 50° C. from one side.

The smoothness of the stalls results in a "clean" plotted ionic current signal, which is shown in FIG. 6. The ionic current for an asymmetrical nanopore in PET and Kapton (0.1M KCl, pH 7) is compared in FIG. 6.

The experiments carried out demonstrate the superior properties of the ionic current characteristic of the Kapton sheet compared with polyester sheets. Asymmetrical nanoopores in Kapton rectify the current and ensure a stable ionic current signal.

As can be seen from the above, a pore of a membrane according to the invention exhibits a geometrical asymmetry having a very sharp conical apex in the nanometer range. The ion transport through the membrane results in a stable signal and, in particular, the ionic current through the pores is characterised by an asymmetrical current/voltage characteristic. The pores respond rapidly to external stimuli, e.g. voltage.

Possible fields of use of the membrane according to the invention are especially special filtration processes, rapid control processes with time constants of the order of fractions of a second, voltage control nanosystems, which generate stable signals. Such uses, and also other uses, may be found, for example, in the medical industry field, in the field of pharmacology and in the field of environmental protection.

What is claimed is:

1. A method of producing nanostructures in membranes, comprising the steps of:
    irradiating a membrane consisting of a polymer material with ions, to produce particle tracks;
    etching the particle tracks of the membrane with an etching liquid; and
    stopping the etching operation with a stop liquid, such that asymmetrical structures are formed;
   wherein said polymer material is a polyimide.

2. The method according to claim 1, wherein the polyimide is comprised of aromatic rings.

3. The method according to claim 1, wherein the etching liquid is a NaOCl solution.

4. The method according to claim 1, wherein the stop liquid is a reducing agent.

5. The method according to claim 4, wherein the reducing agent is a solution of the redox type comprising KI, $NO_2^-$, $S_2O_3^2$ or $Mn^{2+}$.

6. A membrane having asymmetrical pores, consisting of polyimide and produced in accordance with the method of claim 1.

* * * * *